(12) United States Patent
Ochiai

(10) Patent No.: US 9,053,247 B2
(45) Date of Patent: Jun. 9, 2015

(54) MONITOR CIRCUIT, BUS SYSTEM, AND BUS BRIDGE

(75) Inventor: Wataru Ochiai, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 824 days.

(21) Appl. No.: 13/299,160

(22) Filed: Nov. 17, 2011

(65) Prior Publication Data

US 2012/0137033 A1    May 31, 2012

(30) Foreign Application Priority Data

Nov. 26, 2010   (JP) .................................. 2010-263711

(51) Int. Cl.
G06F 13/36    (2006.01)
G06F 13/40    (2006.01)

(52) U.S. Cl.
CPC .................................. G06F 13/4059 (2013.01)

(58) Field of Classification Search
USPC ............ 710/18, 34, 35, 39, 56, 57, 300, 110, 710/305, 306, 310, 311, 240
See application file for complete search history.

(56) References Cited

U.S. PATENT DOCUMENTS

| | | | | |
|---|---|---|---|---|
| 5,388,246 A | * | 2/1995 | Kasai | 710/52 |
| 5,619,679 A | * | 4/1997 | Ibi | 711/167 |
| 6,065,089 A | * | 5/2000 | Hickerson et al. | 710/266 |
| 6,460,095 B1 | * | 10/2002 | Ueno et al. | 710/52 |

FOREIGN PATENT DOCUMENTS

| | | |
|---|---|---|
| JP | 7-210500 A | 8/1995 |
| JP | H11-259416 A | 9/1999 |

\* cited by examiner

*Primary Examiner* — Khanh Dang
(74) *Attorney, Agent, or Firm* — Canon USA, Inc. IP Division

(57) ABSTRACT

By connecting, to a bus bridge according to a configuration of a bus system, a monitor circuit including an activation control circuit generating a counter activation signal from an input monitor activation signal, a counter circuit, activated by the counter activation signal, counting the transfer number using a signal of bridge transfer completion indicating an issuance of one transfer from a bus bridge, and outputting a count completion signal when the transfers of the same number as that stuck in the bus bridge indicated by the signal of the transfer number stuck in the bridge is issued when being activated, and a completion control circuit outputting a monitor completion signal upon receiving the count completion signal from the counter circuit, consistency of data may be guaranteed in any bus system without changing the configuration of the bus bridge based on the number of masters accessing the bus bridge.

5 Claims, 8 Drawing Sheets

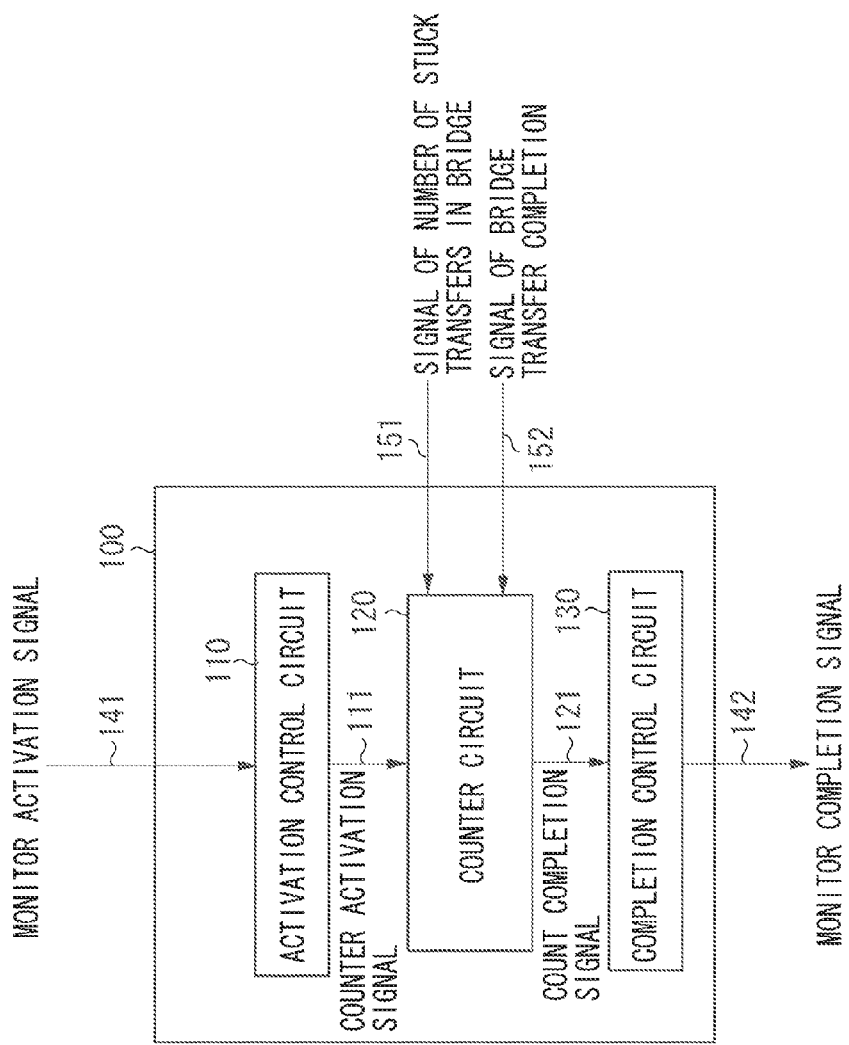

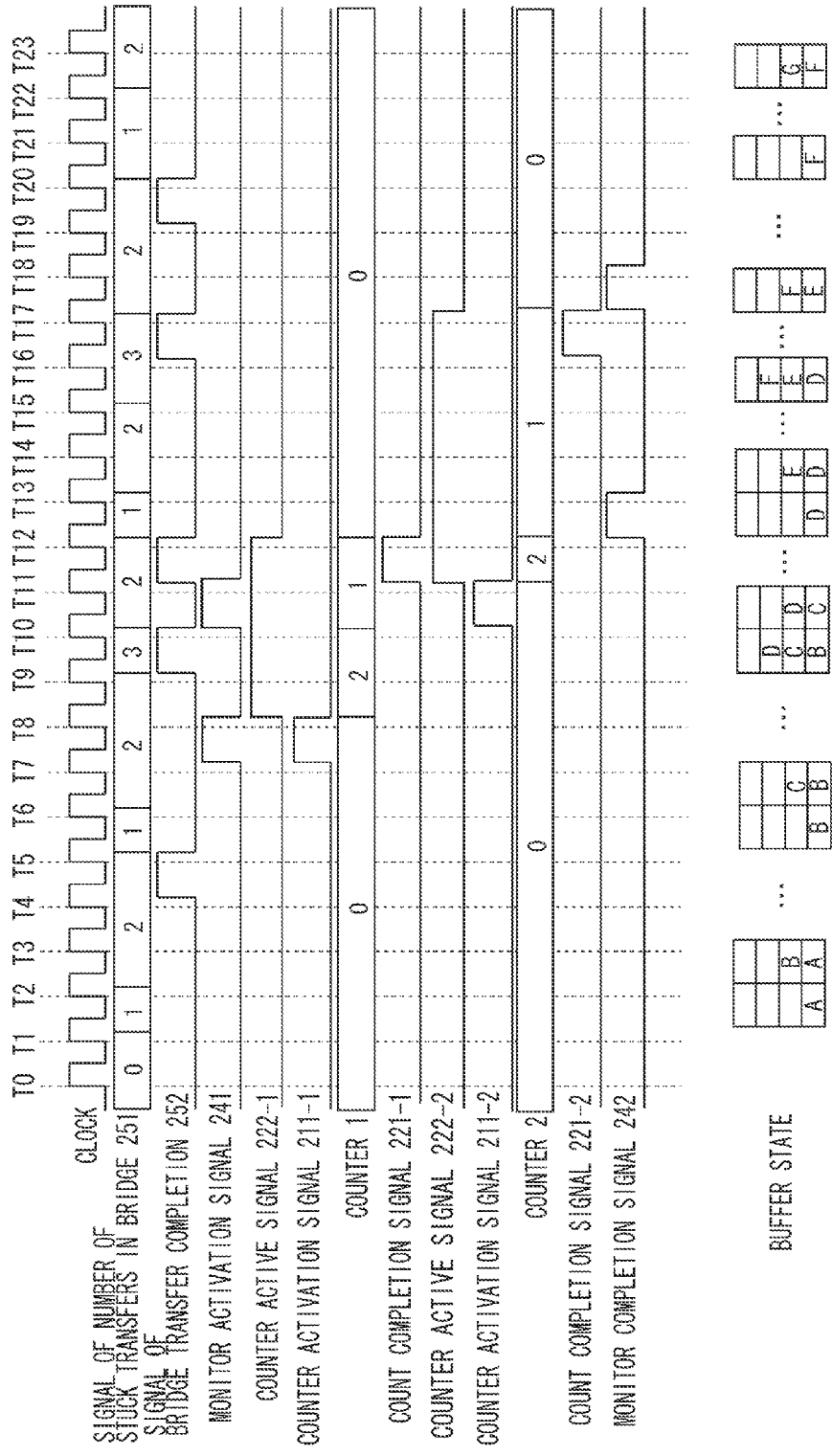

MONITOR CIRCUIT, BUS SYSTEM, AND BUS BRIDGE

BACKGROUND OF THE INVENTION

1. Field of the Invention

Embodiments of the present invention relate to a monitor circuit, a bus system, and a bus bridge, which may be used as a bus system whose storage unit is shared by a plurality of masters.

2. Description of the Related Art

Conventionally, when a plurality of masters uses a main storage unit as a shared memory, it is frequently performed that a first master writes data into the shared memory and then a second master reads the data therefrom.

When the second master reads from the shared memory the data written by the first master thereto, before the second master starts a reading operation, it needs to be guaranteed that the first master has completed writing the data into the shared memory. A technique for ensuring such data writing is discussed in Japanese Patent Application Laid-Open No. 7-210500.

FIG. 6 illustrates an example of a configuration of a conventional bus system.

In the bus system illustrated in FIG. 6, an operation will be performed as below in which a master 901 writes data into a shared memory 903, and then a master 902 reads the data therefrom.

The master 901 writes the data into the shared memory 903 via a bus 904, a bus bridge 900, and a bus 905. At this point, when completing writing (transfer) the data into the bus bridge 900, the master 901 asserts a transfer completion signal.

Upon receiving the data written by the master 901 with a transfer control circuit 910, the bus bridge 900 starts writing the data into the shared memory 903 via the bus 905. A transfer monitor circuit 930 monitors the transfer control circuit 910 writing the data into the shared memory 903, and when the transfer control circuit 910 completes writing the data, the transfer monitor circuit 930 notifies an interruption control circuit 920 of transfer completion.

The transfer completion signal has been input from the master 901 to the interruption control circuit 920, and when the transfer completion signal is asserted, the interruption signal is output from the interruption control circuit 920 to the master 902. However, the interruption control circuit 920 masks the interruption signal to the master 902 until receiving the transfer completion notice from the transfer monitor circuit 930, and, upon receiving the transfer completion notice from the transfer monitor circuit 930, cancels masking of the interruption signal to the master 902.

When the interruption signal from the bus bridge 900 is asserted, the master 902 starts reading the data from the shared memory 903. At this point, the master 901 has completed writing the data into the shared memory 903.

As described above, the master 902 is controlled not to be activated until it is confirmed that the transfer to the shared memory 903 is issued in the bus bridge 900 so that consistency between writing data and reading data is guaranteed.

However, the above-described example of a conventional bus system includes one master which accesses the bus bridge 900. When the number of masters is increased, the interruption control circuit 920 included in the bus bridge 900 needs to be changed according to the number of masters. In other words, the bus bridge of the conventional bus system illustrated in FIG. 6 is not sufficiently flexible for being diverted into various types of bus systems.

SUMMARY OF THE INVENTION

One disclosed aspect of the embodiments is directed to a bus system capable of guaranteeing consistency of data without changing a configuration of a bus bridge according to the number of masters.

According to an aspect of the embodiments, a monitor circuit that monitors transfer of data from a master via a bus bridge, the monitor circuit includes an activation control circuit configured to generate a counter activation signal from an input monitor activation signal, a counter circuit configured to be activated by the counter activation signal output from the activation control circuit, and a completion control circuit configured to, upon receiving a count completion signal from the counter circuit, output a monitor completion signal, wherein the counter circuit receives a signal of number of stuck transfers in bridge indicating the number of transfers stuck in the bus bridge and a signal of bridge transfer completion indicating that a transfer is issued from the bus bridge, counts the number of transfers issued using the signal of bridge transfer completion when being activated by the counter activation signal, and then outputs the count completion signal when the transfers of the same number as that indicated by the signal of number of stuck transfers in bridge are issued when being activated.

Further features and aspects of the embodiments will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1A illustrates an example of a monitor circuit according to a first exemplary embodiment of the present invention.

FIG. 2B is a timing chart illustrating an example of an operation of the monitor circuit illustrated in FIG. 2A.

DESCRIPTION OF THE EMBODIMENTS

Figure 1B:
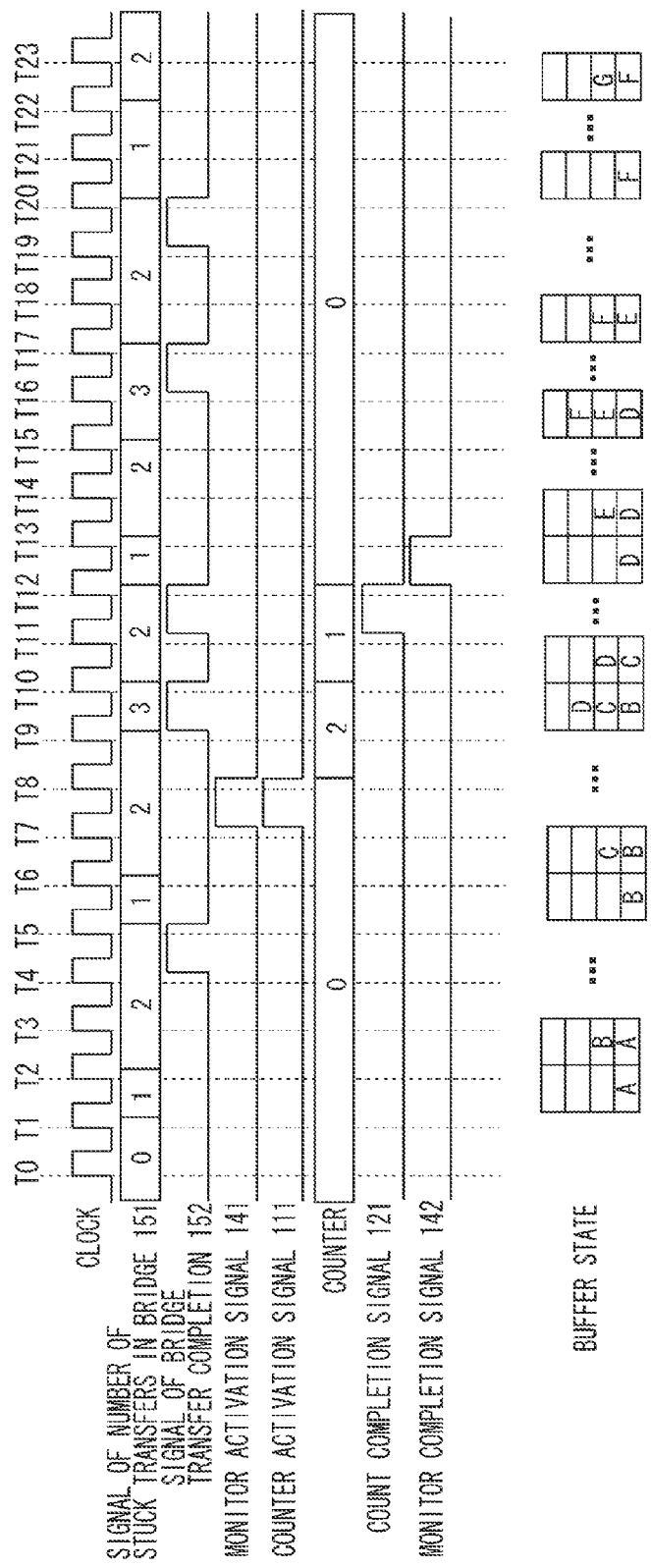
FIG. 1B is a timing chart illustrating an example of an operation of the monitor circuit illustrated in FIG. 1A.

Various exemplary embodiments, features, and aspects of the invention will be described in detail below with reference to the drawings. One disclosed feature of the embodiments may be described as a process which is usually depicted as a flowchart, a flow diagram, a timing diagram, a structure diagram, or a block diagram. Although a flowchart or a timing diagram may describe the operations or events as a sequential process, the operations may be performed, or the events may occur, in parallel or concurrently. In addition, the order of the operations or events may be re-arranged. A process is terminated when its operations are completed. A process may correspond to a method, a program, a procedure, a method of manufacturing or fabrication, a sequence of operations performed by an apparatus, a machine, or a logic circuit, etc.

A first exemplary embodiment will be described.

FIG. 1A illustrates an example of a configuration of a monitor circuit 100 according to the first exemplary embodiment.

The monitor circuit 100 includes an activation control circuit 110, a counter circuit 120, and a completion control circuit 130.

A monitor activation signal 141 is input to the activation control circuit 110 from an outside of the monitor circuit 100. The activation control circuit 110 generates a counter activation signal 111 that activates the counter circuit 120 from the input monitor activation signal 141.

The counter activation signal 111 is input to the counter circuit 120 from the activation control circuit 110, and also a signal of number of stuck transfers in bridge 151 and a signal of bridge transfer completion 152 are input from a bus bridge (not illustrated) connected to the monitor circuit 100. The signal of number of stuck transfers in bridge 151 indicates the number of transfers stuck in the bus bridge, and the signal of bridge transfer completion 152 indicates an issuance of one transfer from the bus bridge.

When being activated by the counter activation signal 111, the counter circuit 120 sets a counter to the number of transfers (the number of stuck transfers) indicated by the signal of number of stuck transfers in bridge 151. Further, the counter circuit 120 decrements a counter value by one every time the signal of bridge transfer completion 152 is asserted, and then generates a count completion signal 121 when the counter value becomes "0".

The count completion signal 121 is input to the completion control circuit 130 from the counter circuit 120. The completion control circuit 130 receives the count completion signal 121 to generate and output a monitor completion signal 142.

FIG. 1B is a timing chart illustrating an example of an operation of the monitor circuit 100 illustrated in FIG. 1A.

The signal of number of stuck transfers in bridge 151 indicates the number of transfers stuck in the bus bridge. The number of transfers stuck in the bus bridge is incremented by one when the bus bridge receives transfer, and is decremented by one when the transfer is issued from the bus bridge. For example, as 0, 1, 2, 1, 2, 3 as illustrated in FIG. 1B, the number of transfers is appropriately incremented/decremented. Further, the signal of bridge transfer completion 152 indicates that one transfer stuck in the bus bridge is issued, and when the signal of bridge transfer completion 152 is asserted, the number of stuck transfers is decremented by one. A stuck state of the transfer in the bus bridge at this point is illustrated in FIG. 1B as a buffer state.

As illustrated in FIG. 1B, the monitor activation signal 141 is asserted with a timing of T7. When the monitor activation signal 141 is asserted, the activation control circuit 110 generates the counter activation signal 111 to activate the counter circuit 120.

When being activated by the counter activation signal 111, the counter circuit 120 sets the counter to the number "2" of stuck transfers indicated by the signal of number of stuck transfers in bridge 151 with a timing of T8. At this point, the transfers stuck in the bus bridge are "B" and "C".

Subsequently, when detecting that the signal of bridge transfer completion 152 is asserted with timings of T10 and T12, the counter circuit 120 decrements the counter value by each one for each timing. With this arrangement, the counter value changes "2"→"1"→"0".

The counter circuit 120 outputs the count completion signal 121 with a timing when the signal of bridge transfer completion 152 for changing the counter value "1"→"0" is asserted, and then notifies the completion control circuit 130 that a count operation has been completed. In other words, with a timing when the counter value is "1" and also when the signal of bridge transfer completion 152 is asserted, the counter circuit 120 outputs the count completion signal 121.

Upon receiving the assertion of the count completion signal 121, the completion control circuit 130 asserts the monitor completion signal 142. At this point, as illustrated as a buffer state, the transfers "B" and "C" are not stuck in the bus bridge, but have been issued therefrom.

According to the first exemplary embodiment, when the monitor activation signal 141 is asserted, the monitor circuit 100 sets an internal counter to the number of stuck transfers indicated by the signal of number of stuck transfers in bridge 151. Subsequently, the monitor circuit 100 counts the signal of bridge transfer completion 152 being asserted as the same number of times as that of stuck transfers by using the counter, and then, when completing counting, asserts the monitor completion signal 142. In other words, when the monitor activation signal 141 is asserted, if it is detected that the signal of bridge transfer completion 152 has been asserted as the same number of times as that of stuck transfers indicated by the signal of number of stuck transfers in bridge 151, the monitor circuit 100 asserts the monitor completion signal 142.

As described above, the monitor circuit 100 asserts the monitor completion signal 142 after confirming that the stuck transfer has been issued in the bus bridge. With this arrangement, by only inputting the signal of number of stuck transfers in bridge 151 and the signal of bridge transfer completion 152 from the bus bridge, the monitor circuit 100 may notify the outside that the transfer to be transferred has been issued from the bus bridge using the monitor completion signal 142.

According to the above-described description, the counter in the counter circuit 120 counts down, but, it may count up. For counting up, when the counter circuit 120 is activated by the counter activation signal 111, the number of transfers indicated by the signal of number of stuck transfers in bridge 151 is maintained.

The counter circuit 120 may increment the counter value by one every time the signal of bridge transfer completion 152 is asserted with an initial value of the counter set to "0", and then generate the count completion signal 121 when the counter value becomes the maintained number of transfers.

Further, in the above description, the monitor activation signal 141 and the monitor completion signal 142 are described as pulse signals, but, they may be level signals.

Next, a second exemplary embodiment of the present invention will be described.

Figure 2A:
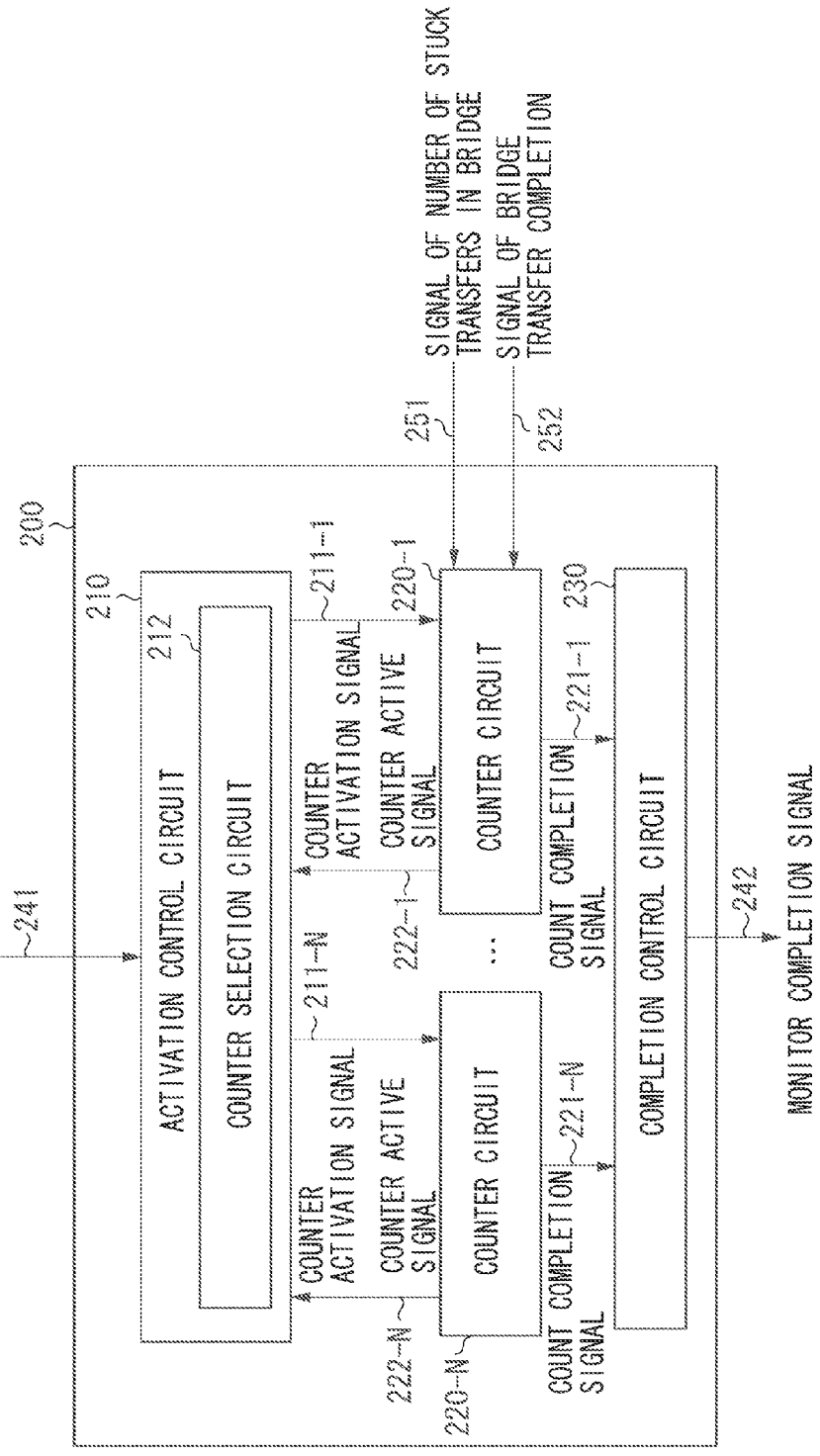
FIG. 2A illustrates an example of a monitor circuit according to a second exemplary embodiment of the present invention.

FIG. 2A illustrates an example of a configuration of a monitor circuit 200 according to the second exemplary embodiment.

The monitor circuit 200 includes an activation control circuit 210, a plurality of counter circuits 220-$i$ ("$i$" is a suffix and an integer satisfying $i=1$ to N (N is "2" or more), and similarly used herebelow) and a completion control circuit 230.

A monitor activation signal 241 is input to the activation control circuit 210 from an outside of the monitor circuit 200, and also, a counter active signal 222-$i$ is input thereto from respective counter circuits 220-$i$. With reference to the counter active signal 222-$i$, the activation control circuit 210 generates a counter activation signal 211-$i$ that activates the counter circuit 220-$i$ from the input monitor activation signal 241.

The activation control circuit 210 includes a counter selection circuit 211. The activation control circuit 210 selects a counter circuit 220-$i$ that is not in an active state by the counter selection circuit 211 as a counter circuit that performs activation according to the monitor activation signal 241.

To each counter circuit 220-$i$, the counter activation signal 211-$i$ corresponding thereto is input from the activation control circuit 210 and also a signal of number of stuck transfers in bridge 251 and a signal of bridge transfer completion 252 are input from the bus bridge (not illustrated) connected to the monitor circuit 200. The signal of number of stuck transfers in bridge 251 indicates the number of transfers stuck in the bus bridge. The signal of bridge transfer completion 252 indicates that one transfer is issued from the bus bridge.

When being activated by the corresponding counter activation signal 211-$i$, the counter circuit 220-$i$ sets the counter to the number of transfers (the number of stuck transfers) indicated by the signal of number of stuck transfers in bridge 251 when being activated. Further, when being activated by the counter activation signal 211-$i$, the counter circuit 220-$i$ asserts the counter active signal 222-$i$ corresponding thereto, and then notifies the activation control circuit 210 that the counter is in an active state.

The counter circuit 220-$i$ decrements the counter value by one every time the signal of bridge transfer completion 252 is asserted, and then, when the counter value becomes "0", generates the count completion signal 221-$i$. At this point, the counter circuit 220-$i$ de-asserts the counter active signal 222-$i$ corresponding thereto, and then notifies the activation control circuit 210 that the counter is not in the active state any more.

The 221-$i$ is input to the completion control circuit 230 from each counter circuit 220-$i$. On receiving the count completion signal 221-$i$, the completion control circuit 230 generates and outputs a monitor completion signal 242.

FIG. 2B is a timing chart illustrating an example of an operation of the monitor circuit 200 illustrated in FIG. 2A.

In the second embodiment, the monitor circuit 200 including two counter circuits will be described below.

The signal of number of stuck transfers in bridge 251 indicates the number of transfers stuck in the bus bridge. The number of transfers stuck in the bus bridge is incremented by one when the bus bridge receives the transfer, and is decremented by one when the transfer is issued from the bus bridge. Thus, for example, as 0, 1, 2, 1, 2, 3 as illustrated in FIG. 2B, the number of the transfers is appropriately incremented/decremented.

Further, the signal of bridge transfer completion 252 indicates that one transfer stuck in the bus bridge is issued, and when the signal of bridge transfer completion 252 is asserted, the number of stuck transfers is decremented by one. The stuck state of the transfer in the bus bridge at this point is illustrated in FIG. 2B as a buffer state.

As illustrated in FIG. 2B, the monitor activation signal 241 is asserted with a timing of T7. When the monitor activation signal 241 is asserted, the activation control circuit 210 determines whether the counter circuit 220-1 is in the active state with reference to the counter active signal 222-1.

According to the example illustrated in FIG. 2B, since the counter circuit 220-1 is not in the active state, the activation control circuit 210 asserts the counter activation signal 211-1 to activate the counter circuit 220-1. When the counter circuit 220-1 is activated by the counter activation signal 211-1, with a timing of T8, the counter circuit 220-1 sets the counter to the number "2" of stuck transfer indicated by the signal of number of stuck transfers in bridge 251. At this point, the transfers stuck in the bus bridge are "B" and "C".

Subsequently, when detecting that the signal of bridge transfer completion 252 is asserted with timings of T10 and T12, the counter circuit 220-1 decrements the counter value by one for each case. With this arrangement, the counter value of the counter circuit 220-1 changes "2"→"1"→"0".

The counter circuit 220-1 outputs the count completion signal 221-1 with a timing when the signal of bridge transfer completion 252 changing the counter value "1"→"0" is asserted, and then notifies the completion control circuit 230 that the count operation has completed. In other words, the counter circuit 220-1 outputs the count completion signal 221-1 at a timing when the counter value is "1" and also when the signal of bridge transfer completion 252 is asserted.

Further, the monitor activation signal 241 is asserted with a timing of T10. At this point, since the counter circuit 220-1 is in the active state, the activation control circuit 210 activates the counter circuit 220-2 by asserting the counter activation signal 211-2.

When being activated by the counter activation signal 211-2, the counter circuit 220-2 sets the counter to the number "2" of stuck transfers indicated by the signal of number of stuck transfers in bridge 251 with a timing of T11. At this point, the transfers stuck in the bus bridge are "C" and "D".

Subsequently, when detecting that the signal of bridge transfer completion 252 is asserted at timings of T12 and T17, the counter circuit 220-2 decrements the counter value by one for each case. With this arrangement, the counter value of the counter circuit 220-2 changes "2"→"1"→"0".

The counter circuit 220-2 outputs the count completion signal 221-2 at a timing when the signal of bridge transfer completion 252 changing the counter value "1"→"0" is asserted, and then notifies the completion control circuit 230 that the count operation has been completed.

In response to the count completion signal 221-1 being asserted with a timing of T12, the completion control circuit 230 asserts the monitor completion signal 242. At this point, as illustrated as a buffer state, the transfers "B" and "C" are issued from the bus bridge.

Further, in response to the count completion signal 221-2 being asserted with a timing of T17, the completion control circuit 230 asserts the monitor completion signal 242. At this point, as illustrated as a buffer state, the transfers "C" and "D" are issued from the bus bridge.

According to the second exemplary embodiment, when the monitor activation signal 241 is asserted, the monitor circuit 200 sets the counter of the counter circuit 220-$i$ in a non-active state from among a plurality of counter circuits 220-$i$ to the number of stuck transfers indicated by the signal of number of stuck transfers in bridge 251. The monitor circuit 200 counts the signal of bridge transfer completion 252 being asserted as the same number of times as that of the stuck transfers by using the counter, and asserts the monitor completion signal 242 when completing counting.

With this arrangement, only by inputting the signal of number of stuck transfers in bridge 251 and the signal of bridge transfer completion 252 from the bus bridge, the monitor circuit 200 may notify the outside that the transfer to be transferred has been issued from the bus bridge using the monitor completion signal 242.

Further, since the plurality of counter circuits are included, before the transfer that is stuck in the bus bridge and to be transferred is issued, even if the monitor activation signal 241 is further asserted, it may be monitored that each transfer to be transferred is issued from the bus bridge.

According to the above-described description, the counter circuit 220-*i* counts down, but, it may count up. For counting up, when the counter circuit 220-*i* is activated by the counter activation signal 211-*i*, the number of transfers indicated by the signal of number of stuck transfers in bridge 251 is maintained.

The counter circuit 220-*i* may increment the counter value by one every time the signal of bridge transfer completion 252 is asserted with the initial value of the counter set to "0", and then generate the count completion signal 221-*i* when the counter value becomes the maintained number of transfers.

Further, in the above description, the monitor activation signal 241 and the monitor completion signal 242 are described as pulse signals, but, they may be level signals.

The bus system to which the above-described monitor circuit is applied will be described below.

Figure 3:
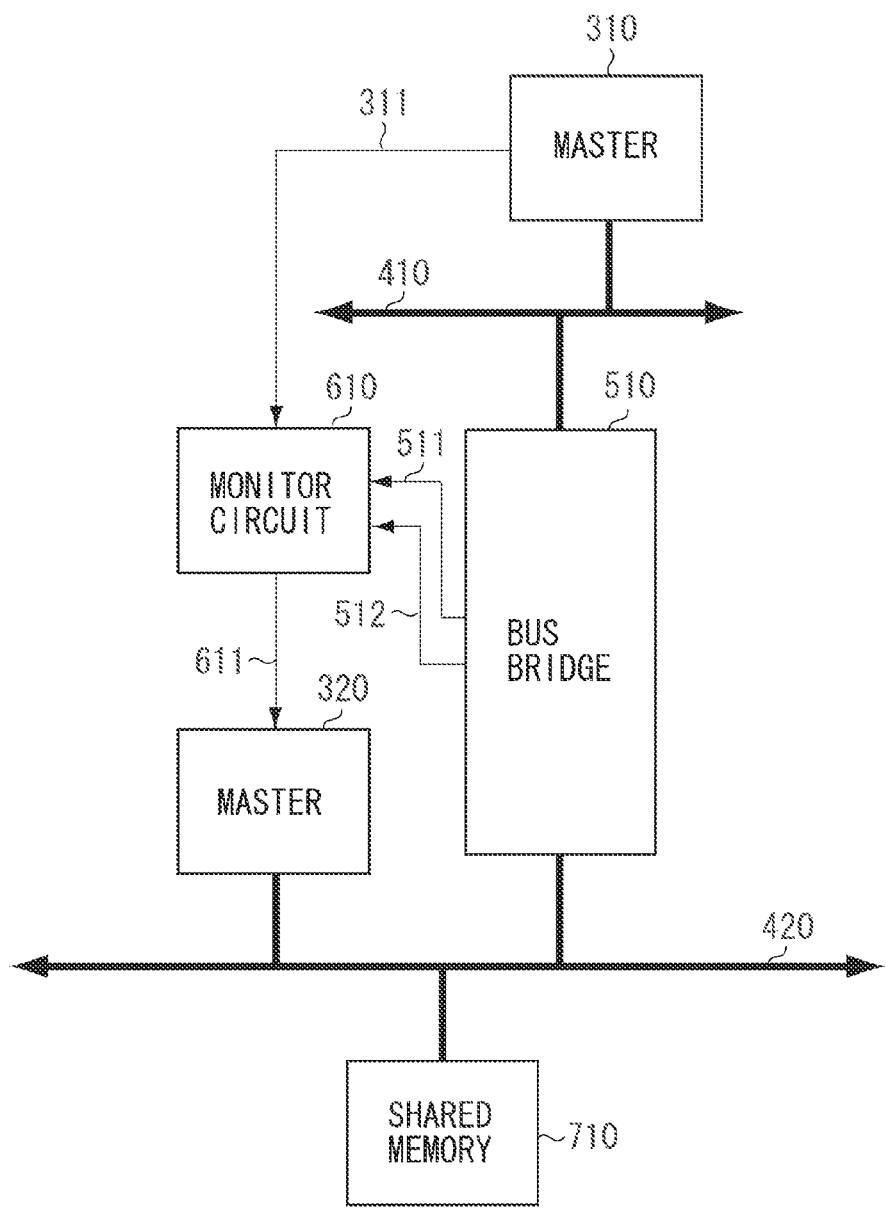
FIG. 3 illustrates an example of a bus system to which a monitor circuit is applied.

FIG. 3 illustrates an example of a bus system to which the monitor circuit is applied according to the exemplary embodiment of the present invention.

The bus system illustrated in FIG. 3 includes a first master 310, a second master 320, a bus bridge 510, a monitor circuit 610, and a shared memory 710. The first master 310 and the bus bridge 510 are connected to a first bus 410. Further, the second master 320, the bus bridge 510, and the shared memory 710 are connected to a second bus 420.

The first master 310 writes the data into the shared memory 710 via, for example, the first bus 410, the bus bridge 510, and the second bus 420. When completing writing (transfer) of the data into the bus bridge 510, the first master 310 asserts a transfer completion signal 311.

Upon receiving the writing of the data into the shared memory 710 from the first master 310, the bus bridge 510 writes the data into the shared memory 710 via the second bus 420. The bus bridge 510 outputs a signal of number of stuck transfers in bridge 511 indicating the number of transfers stuck inside thereof and a signal of bridge transfer completion 512 indicating an issuance of one transfer to the outside.

The monitor circuit 610 is an above-described monitor circuit adopted in the exemplary embodiment of the present invention, and monitors a state of transferring the data via the bus bridge 510. To the monitor circuit 610, the signal of number of stuck transfers in bridge 511 and the signal of bridge transfer completion 512 are input from the bus bridge 510 as well as the transfer completion signal 311 from the first master 310 as a monitor activation signal.

Further, the monitor circuit 610 outputs a monitor completion signal 611. When the monitor circuit 610 detects that the signal of bridge transfer completion 512 is asserted as the same number of times as that of stuck transfers indicated by the signal of number of stuck transfers in bridge 511 when being activated, the monitor circuit 610 asserts the monitor completion signal 611.

The monitor completion signal 611 of the monitor circuit 610 is input to second master 320 as an activation signal (interruption signal). For example, when the monitor completion signal 611 of the monitor circuit 610 is asserted, the second master 320 starts a data reading operation to read the data from the shared memory 710.

Suppose that in the bus system illustrated in FIG. 3, the first master 310 accesses the shared memory 710 via the bus bridge 510, and the second master 320 accesses the shared memory 710.

In that case, the monitor circuit 610 confirms that the transfer has been issued from the first master 310 to the shared memory 710, and then asserts the monitor completion signal 611 to activate the second master 320. Thus, since the second master 320 accesses the shared memory 710 after the transfer has been issued from the first master 310 to the shared memory 710, the consistency of the data may be maintained between the first master 310 and second master 320.

Figure 4:
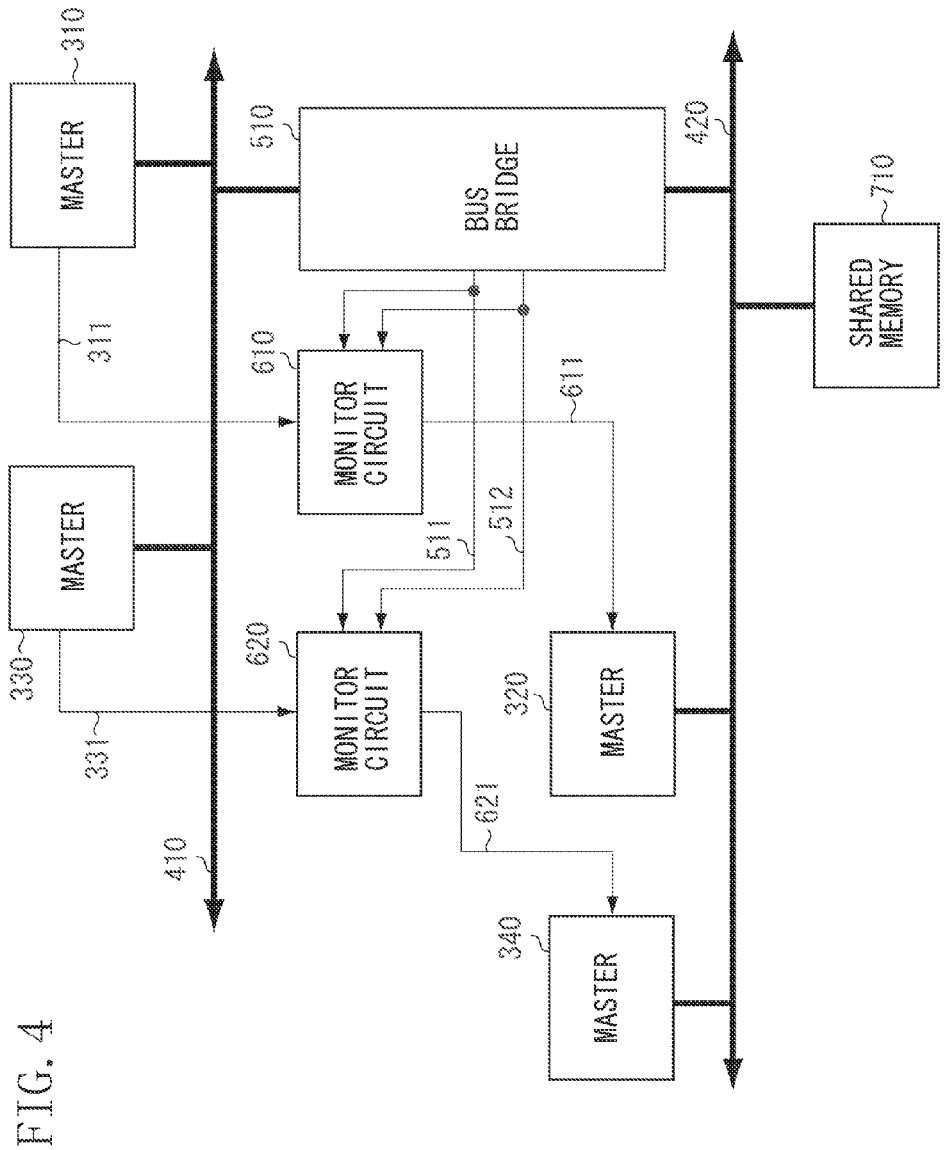
FIG. 4 illustrates another example of a bus system to which a monitor circuit is applied according to an exemplary embodiment of the present invention.

FIG. 4 illustrates another example of a bus system to which a monitor circuit is applied according to an exemplary embodiment of the present invention.

The bus system illustrated in FIG. 4 includes the first master 310, the second master 320, a third master 330, a fourth master 340, the bus bridge 510, a first monitor circuit 610, a second monitor circuit 620, and the shared memory 710.

The first master 310, the third master 330, and the bus bridge 510 are connected to the first bus 410. Further, the second master 320, the fourth master 340, the bus bridge 510, and the shared memory 710 are connected to the second bus 420.

The first master 310, the second master 320, and the first monitor circuit 610 illustrated in FIG. 4 are provided in a similar manner to the first master 310, the second master 320, and the monitor circuit 610 illustrated in FIG. 3.

The third master 330 writes the data into the shared memory 710 via, for example, the first bus 410, the bus bridge 510, and the second bus 420. When the data has been completed to be written (transferred) to the bus bridge 510, the third master 330 asserts a transfer completion signal 331.

Upon receiving the writing of the data into the shared memory 710 from the first master 310 and the third master 330, the bus bridge 510 writes the data into the shared memory 710 via the second bus 420. The bus bridge 510 outputs the signal of number of stuck transfers in bridge 511 indicating the number of transfers stuck inside thereof and the signal of bridge transfer completion 512 indicating the issuance of one transfer to the outside.

The second monitor circuit 620 is the above-described monitor circuit provided in the exemplary embodiment of the present invention, and monitors the state of transferring the data via the bus bridge 510. To the second monitor circuit 620, the signal of number of stuck transfers in bridge 511 and the signal of bridge transfer completion 512 are input from the bus bridge 510 as well as the transfer completion signal 331 from the third master 330 as a monitor activation signal.

Further, the second monitor circuit 620 outputs a monitor completion signal 621. When the second monitor circuit 620 detects that the signal of bridge transfer completion 512 is asserted as the same number of times as that of stuck transfers indicated by the signal of number of stuck transfers in bridge 511 when being activated, the second monitor circuit 620 asserts the monitor completion signal 621.

When the monitor completion signal 621 of the second monitor circuit 620 is input into the fourth master 340 as an activation signal (interruption signal) and, for example, when the monitor completion signal 621 is asserted, the fourth master 340 starts the data reading operation to read the data from the shared memory 710.

Suppose that, in the bus system illustrated in FIG. 4, the first master 310 accesses the shared memory 710 via the bus bridge 510, the second master 320 accesses the shared memory 710, the third master 330 accesses the shared memory 710 via the bus bridge 510, and the fourth master 340 accesses the shared memory 710.

In that case, the monitor circuit 610 confirms that the transfer has been issued from the first master 310 to the shared memory 710, and then asserts the monitor completion signal 611 to activate the second master 320. Further, the second monitor circuit 620 confirms that the transfer has been issued from the third master 330 to shared memory 710, and then asserts the monitor completion signal 621 to activate the fourth master 340.

Thus, since the second master 320 accesses the shared memory 710 after the transfer has been issued from the first master 310 to the shared memory 710, the consistency of the data may be maintained between the first master 310 and second master 320.

Moreover, since the fourth master 340 accesses the shared memory 710 after the transfer has been issued from the third master 330 to the shared memory 710, the consistency of the data may be maintained between the third master 330 and fourth master 340.

Figure 5:
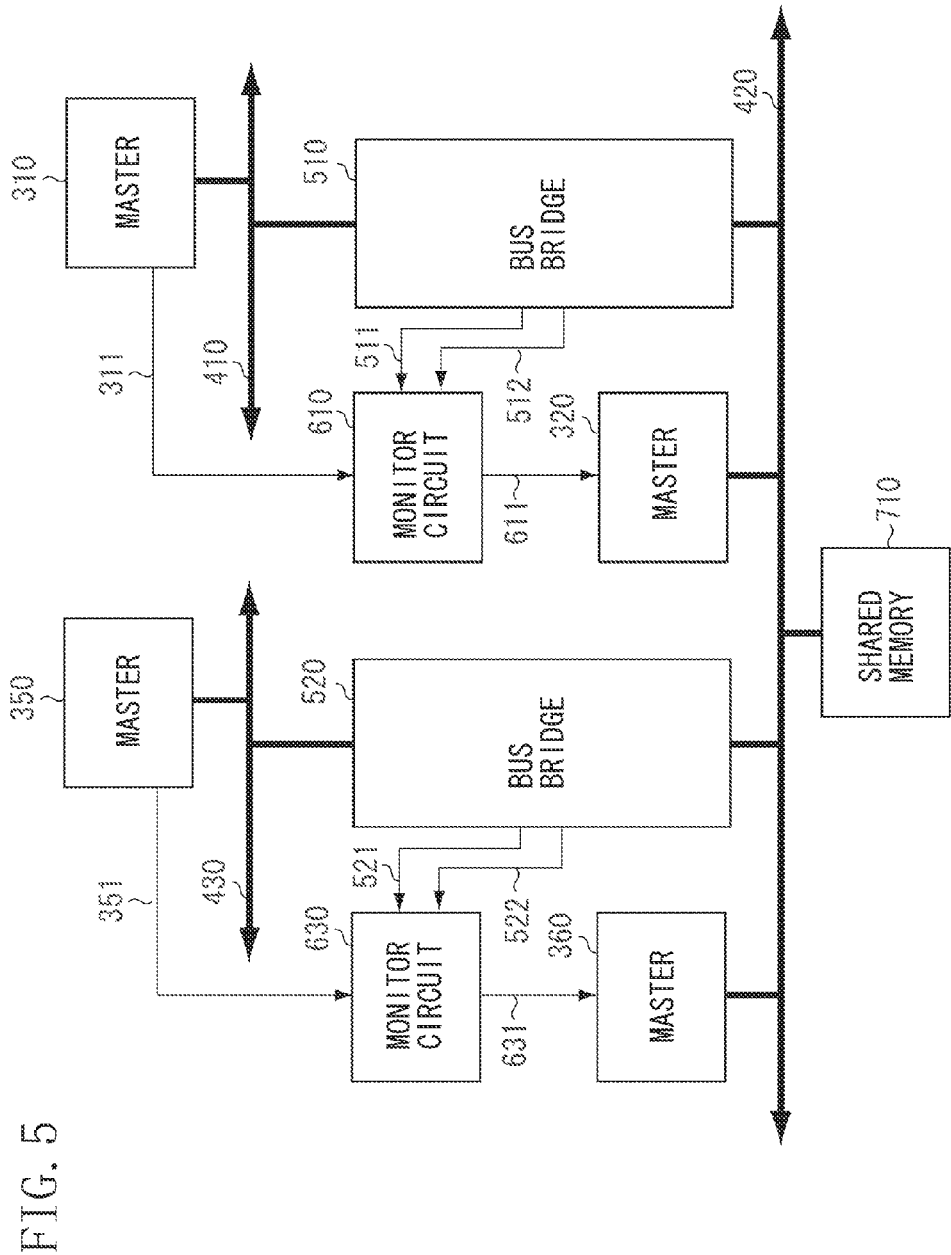
FIG. 5 illustrates yet another example of a bus system to which monitor circuits are applied according to an exemplary embodiment of the present invention.
Figure 6:
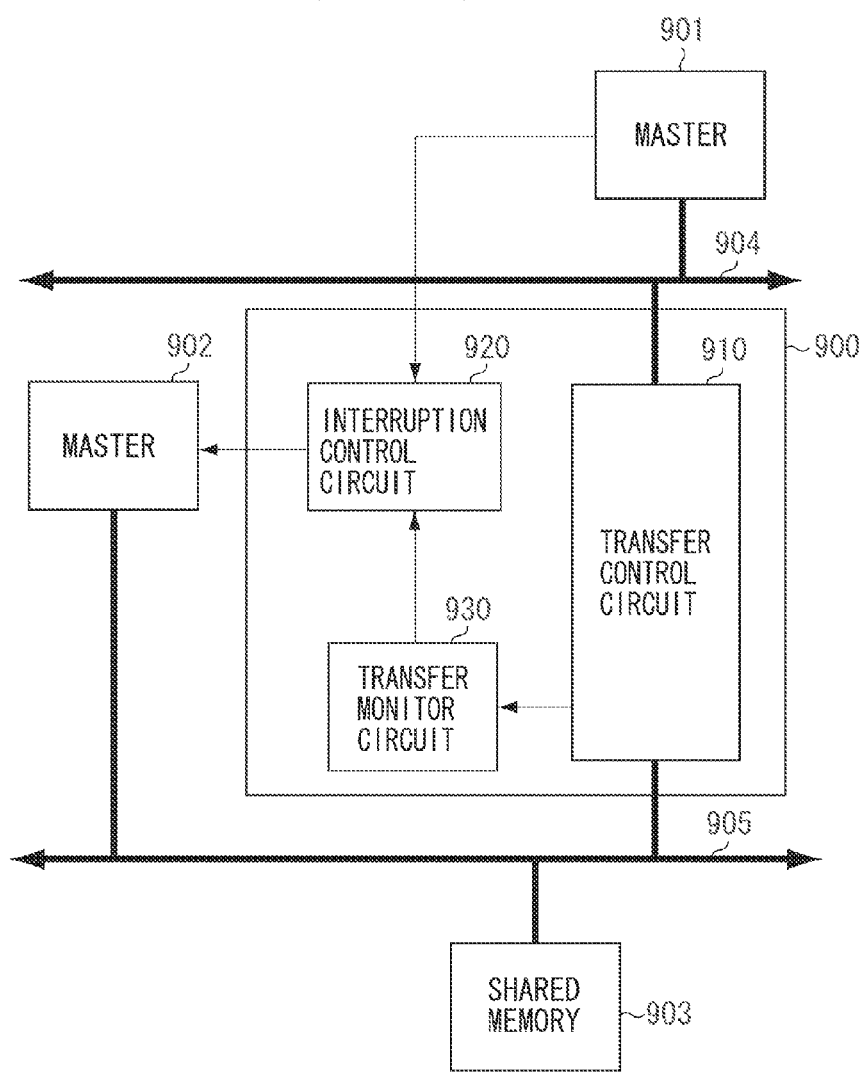
FIG. 6 illustrates an example of a configuration of a conventional bus system.

FIG. 5 illustrates yet another example of a bus system to which monitor circuits are applied according to an exemplary embodiment of the present invention.

The bus system illustrated in FIG. 5 includes the first master 310, the second master 320, a third master 350, a fourth master 360, the bus bridge 510, a second bus bridge 520, the monitor circuit 610, a second monitor circuit 630, and the shared memory 710.

The first master 310 and the bus bridge 510 are connected to the first bus 410. The second master 320, the fourth master 360, the first bus bridge 510, the second bus bridge 520, and the shared memory 710 are connected to the second bus 420. Further, the third master 350 and the second bus bridge 520 are connected to the third bus 430.

The first master 310, the second master 320, the first bus bridge 510, and the first monitor circuit 610 illustrated in FIG. 5 are provided in a similar manner to first master 310, the second master 320, the bus bridge 510, and the monitor circuit 610 illustrated in FIG. 3.

The third master 350 writes the data into the shared memory 710 via, for example, the third bus 430, the second bus bridge 520, and the second bus 420. When the data has been completed to be written (transferred) into the second bus bridge 520, the third master 350 asserts the transfer completion signal 351.

Upon receiving the writing of the data into the shared memory 710 from the third master 350, the second bus bridge 520 writes the data into the shared memory 710 via the second bus 420. The second bus bridge 520 outputs the signal of number of stuck transfers in bridge 521 indicating the number of transfers stuck inside thereof and the signal of bridge transfer completion 522 indicating the issuance of one transfer to the outside.

The second monitor circuit 630 is the above-described monitor circuit adopted in the exemplary embodiment of the present invention, and monitors a state of transferring the data via the second bus bridge 520. To the second monitor circuit 630, the signal of number of stuck transfers in bridge 521 and the signal of bridge transfer completion 522 are input from the second bus bridge 520 as well as the transfer completion signal 351 from the third master 350 as a monitor activation signal.

Further, the second monitor circuit 630 outputs a monitor completion signal 631. When the second monitor circuit 630 detects that the signal of bridge transfer completion 522 is asserted as the same number of times as that of stuck transfers indicated by the signal of number of stuck transfers in bridge 521 when being activated, the second monitor circuit 630 asserts the monitor completion signal 631.

The monitor completion signal 631 of the second monitor circuit 630 is input to fourth master 360 as an activation signal (interruption signal). For example, when the monitor completion signal 631 is asserted, the fourth master 360 starts the data reading operation to read the data from the shared memory 710.

Suppose that in the bus system illustrated in FIG. 5, the first master 310 accesses the shared memory 710 via the first bus bridge 510, the second master 320 accesses the shared memory 710, the third master 350 accesses the shared memory 710 via the second bus bridge 520, and then the fourth master 360 accesses the shared memory 710.

In that case, the monitor circuit 610 confirms that the transfer has been issued from the first master 310 to the shared memory 710, and then asserts the monitor completion signal 611 to activate the second master 320. Further, the second monitor circuit 630 confirms that the transfer has been issued from the third master 350 to the shared memory 710, and then asserts the monitor completion signal 631 to activate the fourth master 360.

Thus, since the second master 320 accesses the shared memory 710 after the transfer has been issued from the first master 310 to the shared memory 710, the consistency of the data may be maintained between the first master 310 and second master 320.

Moreover, since the fourth master 360 accesses the shared memory 710 after the transfer has been issued from the third master 350 to the shared memory 710, the consistency of the data may be maintained between the third master 350 and fourth master 360.

As described above, the signal of number of stuck transfers in bridge indicating the number of transfers stuck in the bus bridge and the signal of bridge transfer completion indicating that one transfer has been issued from the bus bridge are output from the bus bridge, to which the monitor circuit is connected according to a configuration of the bus system. With this arrangement, even without changing the configuration of the bus bridge according to the number of the masters accessing the bus bridge, the consistency of the data may be guaranteed in various types of bus systems by connecting the monitor circuit according to the configuration thereof.

The above-described exemplary embodiments merely describe only one example that embodies the present invention. The technical scope of the embodiments should not be limitedly interpreted. In other words, embodiments of the present invention may be conducted in various ways without departing from the technical ideas and its main features.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-263711 filed Nov. 26, 2010, which is hereby incorporated by reference herein in its entirety.

What is claimed is:

1. A monitor circuit that monitors transfer of data from a master via a bus bridge, the monitor circuit comprising:
    an activation control circuit configured to generate a counter activation signal from an input monitor activation signal;
    a first counter circuit configured to be activated by the counter activation signal output from the activation control circuit;
    a completion control circuit configured to, upon receiving a count completion signal from the first counter circuit, output a monitor completion signal,
    wherein the first counter circuit receives a signal of number of stuck transfers in bridge indicating the number of transfers stuck in the bus bridge and a signal of bridge transfer completion indicating that a transfer is issued from the bus bridge, counts the number of transfers issued using the signal of bridge transfer completion when being activated by the counter activation signal, and then outputs the count completion signal when the transfers of the same number as that indicated by the signal of number of stuck transfers in bridge are issued when being activated; and a second counter circuit, wherein the activation control circuit selects, upon receiving the monitor activation signal, one counter circuit in a non-active state from the first and second counter circuits and to generate the counter activation signal that activates the selected counter circuit.

2. The monitor circuit according to claim 1, wherein each of the first and second counter circuits notifies the activation control circuit of whether being in an active state.

3. A bus system comprising:

a first master connected to a first bus;

a second master connected to a second bus;

a first bus bridge configured to, being connected between the first bus and the second bus, output a signal of number of stuck transfers in bridge indicating the number of transfers stuck in the bus bridge and a signal of bridge transfer completion indicating an issuance of one transfer to the outside;

a first monitor circuit, which is the monitor circuit according to claim 1, connected to the first bus bridge; and a shared memory that is connected to the second bus and accessed by each of the masters, wherein the first monitor circuit, to which a transfer completion signal from the first master indicating that the transfer of the data has been completed from the first master to the first bus bridge is input as a monitor activation signal, outputs a monitor completion signal as an activation signal to the second master.

4. The bus system according to claim 3, comprising:

a third master connected to the first bus;

a fourth master connected to the second bus; and a second monitor circuit, which is the monitor circuit according to claim 1, connected to the first bus bridge, wherein the second monitor circuit receives a transfer completion signal from the third master indicating that the transfer of the data from the third master to the first bus bridge has been completed as a monitor activation signal, and outputs a monitor completion signal as an activation signal to the fourth master.

5. The bus system according to claim 3, further comprising:

a third master connected to a third bus;

a fourth master connected to the second bus;

a second bus bridge, being connected between the second bus and the third bus, configured to output a signal of number of stuck transfers in bridge indicating the number of transfers stuck inside thereof and a signal of bridge transfer completion indicating an issuance of one transfer to the outside; and a second monitor circuit, which is the monitor circuit according to claim 1, connected to the second bus bridge, wherein the second monitor circuit receives a transfer completion signal from the third master indicating that the transfer of the data from the third master to the second bus bridge has been completed as a monitor activation signal, and outputs a monitor completion signal as an activation signal to the fourth master.

* * * * *